United States Patent [19]
Hartmann

[11] Patent Number: 5,022,478
[45] Date of Patent: Jun. 11, 1991

[54] POWER TAKE-OFF FOR FOUR WHEEL DRIVE VEHICLES

[76] Inventor: Dirck T. Hartmann, 4121 Morning Star Dr., Huntington Beach, Calif. 92649

[21] Appl. No.: 517,209

[22] Filed: May 1, 1990

[51] Int. Cl.⁵ .............................................. B60K 17/28
[52] U.S. Cl. .................................. 180/53.1; 74/15.66
[58] Field of Search ........................ 180/53.1; 74/15.66

[56] References Cited

U.S. PATENT DOCUMENTS

| | | | |
|---|---|---|---|
| 1,318,019 | 10/1919 | Simpson | 74/15.66 |
| 2,084,887 | 6/1937 | Bennett | 180/53.1 |
| 4,864,878 | 9/1989 | Pralle | 180/53.1 |

FOREIGN PATENT DOCUMENTS

| | | | |
|---|---|---|---|
| 0237655 | 2/1962 | Australia | 180/53.1 |

Primary Examiner—Richard A. Bertsch
Assistant Examiner—Michael Shaughnessy

[57] ABSTRACT

A power take-off is configured for use on four wheel drive trucks with automatic transmissions and chain driven transfer cases. This power take-off replaces the conventional adapter used between the transmission and the transfer case, and requires no modification of either the transmission or the transfer case. It is driven from the transmission output shaft and can provide power for the operation of an item of auxiliary equipment such as a hydraulic pump or air compressor either with the truck moving, or while the truck is stationary by placing the transfer case in neutral. Since this power take-off requires no modification to the vehicle other than the addition of a shift-wire to a control knob in the cab, it can be readily added to trucks already in use, or offered as a dealer option on new trucks.

2 Claims, 2 Drawing Sheets

POWER TAKE-OFF FOR FOUR WHEEL DRIVE VEHICLES

BACKGROUND OF THE INVENTION

1. Field of the Invention:

This invention relates generally to power take-offs for four wheel drive vehicles and particularly to power take-offs for light four wheel drive vehicles with automatic transmissions and chain driven transfer cases.

2. Description of the Prior Art:

Several gear driven power take-offs are currently marketed for side mounting on gear driven transfer cases. Gear driven power take-offs are also available for use with manual transmission on medium of heavy trucks. There are, however, no power take-offs currently available for use on light four wheel drive trucks and utility vehicles with automatic transmissions and chain driven transfer cases. These vehicles conventionally utilize an adapter which is located between the transmission and the transfer case and to which both the transmission and the transfer case are bolted. The adapter, which is bolted to the vehicle frame, serves to support and align the transmission and transfer case. The output shaft from the transmission passes through the center of the adapter with an involute spline on the transmission shaft engaging a mating spline on the transfer case hub.

It is an object of the present invention to replace the adapter with the housing for a power take-off which has the same bolt pattern, provides the same alignment and support, and has the same axial width as the adapter it replaces, so that no vehicle modification is required for addition of the power take-off other than the installation of a shift wire from the power take-off to a control knob in the cab.

SUMMARY OF THE INVENTION

An object of the present invention is to provide a compact, durable power take-off that can operate for long periods without maintenance or replacement and without affecting the operation of either the transmission or the transfer case.

The power take-off of this invention includes a housing and a mating cover, preferably of cast aluminum. A hole through the housing and an opposed hole through the mating cover are aligned with the axis of the transmission output shaft. A drive bushing with an internal involute spline engages a segment of spline on the transmission shaft forward of the mating hub on the transfer case. A spring on the transmission shaft holds the drive bushing seated against the face of the transfer case hub and a bored hole in the drive bushing is a close fit on the exposed length of hub which extends inside the power take-off housing. A drive sprocket configured for used with a conventional industrial type timing belt, is bolted to the drive bushing.

A hollow driven shaft is mounted in a pair of opposed ball bearings in the power take-off housing and cover outboard of the transfer case on the opposite side of the vehicle from the drive shaft to the front wheels. A short segment of internal involute spline is located on the internal diameter of the driven shaft. A driven sprocket is bolted to a flange on the driven shaft and a high performance heat and oil-resistant timing belt is used to couple the sprockets.

An output shaft located on the axis of the hollow driven shaft, is mounted in a second pair of opposed ball bearings in the power take-off housing and cover. An axially slidable drive ring is rotationally fixed on the output shaft. An external involute spline, which can be engaged or disengaged with the internal spline on the driven shaft through axial motion of the drive ring, is integrally machined on the drive ring.

An axial hole is bored in one end of the output shaft and a pair of diametrically opposed axial slots are milled through the walls of the hole. A shift rob with an inner race of a small ball bearing held captive on one end of the shift rod by a cap srcew threaded into the shift rod, is located on the axis of the hole in the output shaft. The other end of the shift rod, which has a square cross section, passes out through a square broached hole in the power take-off housing. An outer race of the small ball bearing is held captive between a flange on one end of a shift sleeve slidably mounted in the axial hole, and a cylindrical extension on a shift hub located inside the shift sleeve, by a cross pin (preferably a roll pin) which extends through two diametrically opposed holes in the drive ring, through the two axial slots in the output shaft, and through holes in the shift sleeve and shift hub. The axial position of the drive ring is controlled through the shift rod by a shift wire which connects the shift rod with a control knob in the cab. The control knob is pulled out to disengaged the external spline on the drive ring from the internal spline on the driven shaft, and pushed in for re-engagement for power take-off.

DESCRIPTION OF THE PREFERRED EMBODIMENT

Figure 1:
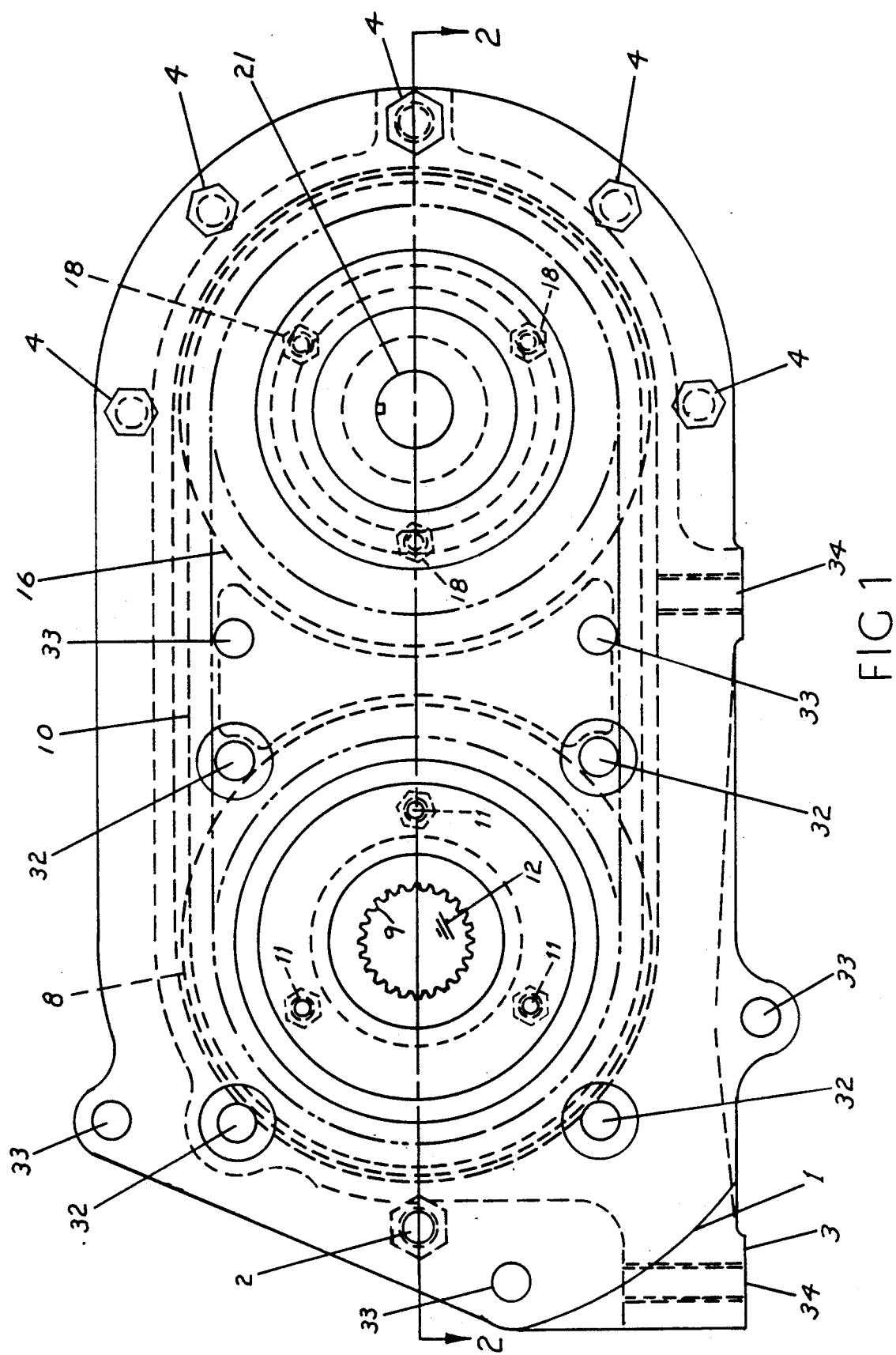
FIG. 1 is a plan view of a power take-off according to the present invention looking at the cover side of the power take-off housing.
Figure 2:
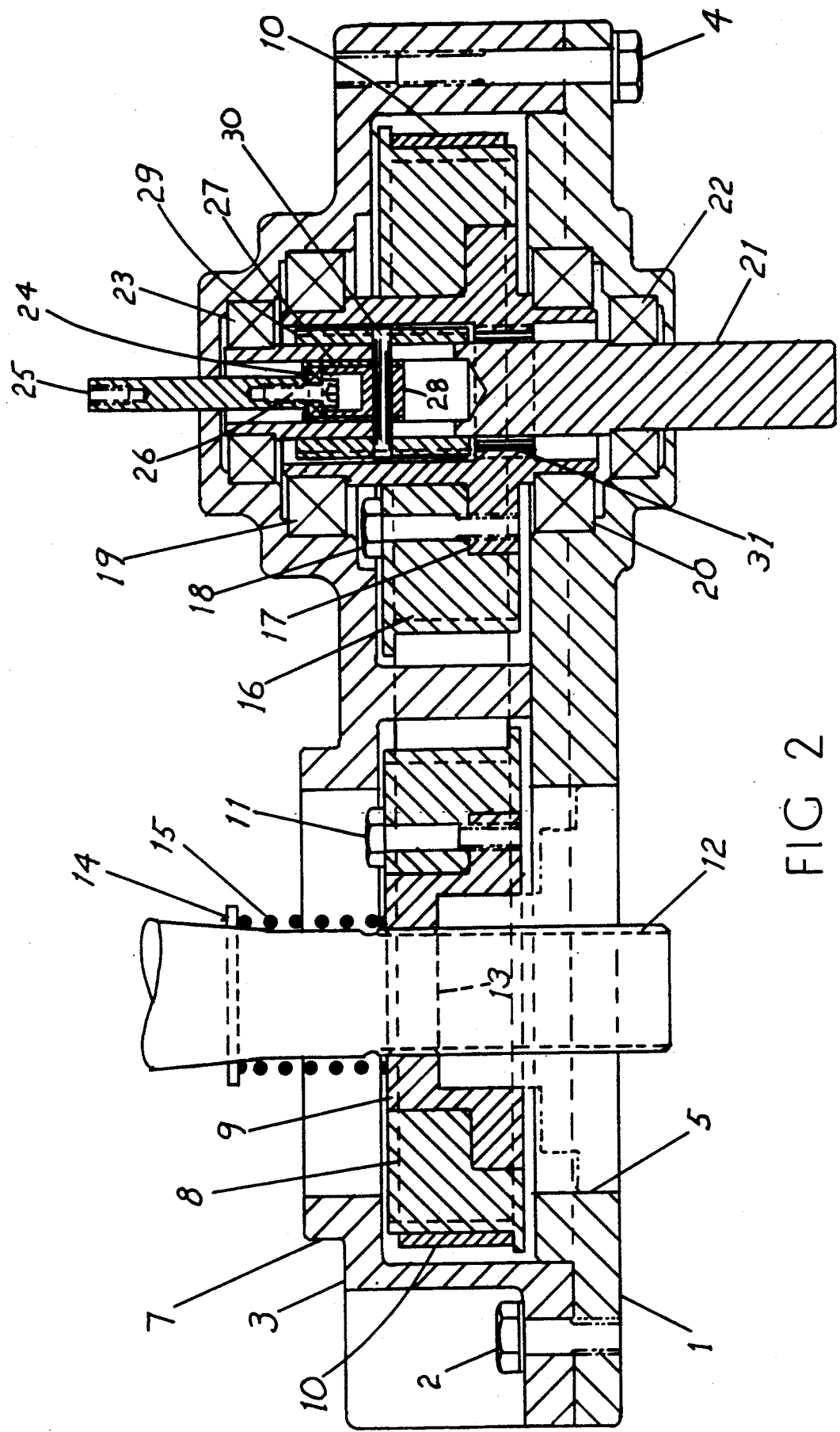
FIG. 2 is a section taken along the line 2—2 of FIG. 1.

Referring to FIG. 1 and particularly to FIG. 2, the power take-off in accordance with the present invention includes a power take-off housing 3 and a mating cover 1 which are joined by the bolts 2 and 4. The housing includes a shoulder 7 which centers the housing in the transmission case (not shown for clarity). The cover 1 includes a bored hole 5 which centers the transfer case and which is concentric with the shoulder 7. The transmission output shaft 12 extends through the housing 3 and cover 1 with an external involute spline on the transmission shaft 12 engaging an internal involute spline in a transfer case shaft with its end shown by the phantom line 13.

A drive bushing 9 has an internal involute spline which engages an exposed section of external spline on the transmission shaft 12 forward of the transfer case shaft 13. A compression spring 15 and washer 14 hold the drive bushing 9 seated against the end of the transfer case shaft 13. A drive sprocket 8 is mounted on the bushing 9 with three bolts 11.

A sealed ball bearing 19 is pressed into the housing 3 and a second sealed ball bearing 20 is pressed into the cover 1. A driven shaft 17 is mounted inside the bearings 19 and 20 and a sprocket 16 is mounted on the driven shaft 17 with three bolts 18. A heat-resistant, high performance timing belt 10 drives the sprocket 16 from the drive sprocket 8.

A second sealed ball bearing 23 with its axis concentric with the ball bearing 19. Is pressed into the housing 3, and a second sealed ball bearing 22 with its axis concentric with the ball bearing 20 is pressed into the cover 1. An output shaft 21 is mounted inside the ball bearings 22 and 23. The central portion of the shaft 21 between the bearings 22 and 23 has a hexagonal cross section so that the bearings 22 and 23 constrain the shaft 21 axially as well as centering it.

A drive ring 29 with a hexagonal hole broached through it is a close slip fit on the hexagonal portion of the shaft 21. An external involute spline is located on the drive ring 29 and a segment of internal involute spline 31 is located inside the driven shaft 17. Axial motion of the drive ring 29 in a direction aft meshes the external spline on the drive ring 29 with the internal spline 31, and axial motion forward (to the position shown) disengages the splines.

Axial position of the drive ring 29 is controlled by a small sealed ball bearing 24 the inner race of which is clamped to a shift rod 25 by a cap screw 26. The shift rod 25 has a square cross section and passes out through a square broached hole in the housing 3 which constrains the shift rod 25 from rotating. A sleeve 27 is a slip fit inside an axial hole bored in the end of the output shaft 21. The outer race of the bearing 24 is captive between a flange on the forward end of the sleeve 27 and a cylindrical extension on a hub 28 which is located inside the sleeve 27. A transverse roll pin 30 passes through two diametrically opposed holes in the drive ring 29, through two diametrically opposed axial slots in the wall of the output shaft 21, and through holes in the sleeve 27 and the hub 28. The length of the roll pin 30 allows the driven shaft 17 to spin freely without contacting it. A conventional wire inside a wire-shroud connects the end of the shift rod 25 with a push-pull knob in the cab for engaging and disengaging the drive ring 29 and driven shaft splines 31.

Referring now to FIG. 1, the four holes 32 are aligned with threaded holes in the transmission case and are used to bolt the power take-off to the transmission with the bolts installed from the aft side of the power take-off. The five holes 33 are aligned with threaded holes in the transfer case and are used to bolt the transfer case to the power take-off with the bolts installed from the forward side of the power take-off. The threaded holes 34 are used to bolt the power take-off to the vehicle frame.

While this invention has been described in terms of a preferred embodiment, it is anticipated that persons skilled in automotive design will realize many possible modifications and alterations. It is therefore intended that the following appended claims include all such modifications and alterations as fall within the true scope and spirit of the present invention.

I claim:

1. In a four wheel drive vehicle including a transmission with a splined shaft, a transfer case, and an adapter located between said transmission and said transfer case and bolted to said transmission and said transfer case for their mutual alignment and support, an improved power take-off which replaces said adapter and comprises:

a power take-off housing and a mating cover with said housing and said cover bolted together and bolted to said transmission and to said transfer case for their mutual alignment and support;

a first sprocket located within said power take-off housing and fixed on said splined transmission shaft for rotation therewith;

a first pair of ball bearings with outer races of said first pair of ball bearings fixed in said power take-off housing and said mating cover respectively;

a driven shaft held centered and axially captive within said first pair of ball bearings;

a central hole through said driven shaft with a short segment of internal spline located within said central hole;

a second sprocket fixed on said driven shaft for rotation therewith;

a toothed belt driving said second sprocket from said first sprocket;

a second pair of ball bearings with outer races of said second pair of ball bearings fixed in said power take-off housing and said mating cover respectively;

an output shaft held centered and axially captive within inner races of said second pair of ball bearings with the axis of rotation of said output shaft aligned along the axis of rotation of said driven shaft;

a drive ring torsionally fixed on said output shaft but axially moveable relative to said output shaft;

an external spline on said drive ring; and positioning means for moving said drive ring into and out of engagement with said internal spline located in said central hole through said driven shaft.

2. A power take-off according to claim 1 wherein said positioning means includes:

an axial hole bored in one end of said output shaft;

a sleeve slidably mounted inside said axial hole;

a small bearing with its outer race captive inside said sleeve and its inner race captive on an inboard end of a shift rod extending out through a hole in said power take-off housing;

a cross pin extending through diametrically opposed holes in said drive ring, axial slots in said output shaft, and diametrically opposed holes through said sleeve; and a shift wire connecting an outboard end of said shift rod with a control knob in said vehicle cab.

* * * * *